Nov. 16, 1926. W. F. CREMEAN Re. 16,472
CAR DOOR MECHANISM
Original Filed April 14, 1924 2 Sheets-Sheet 1
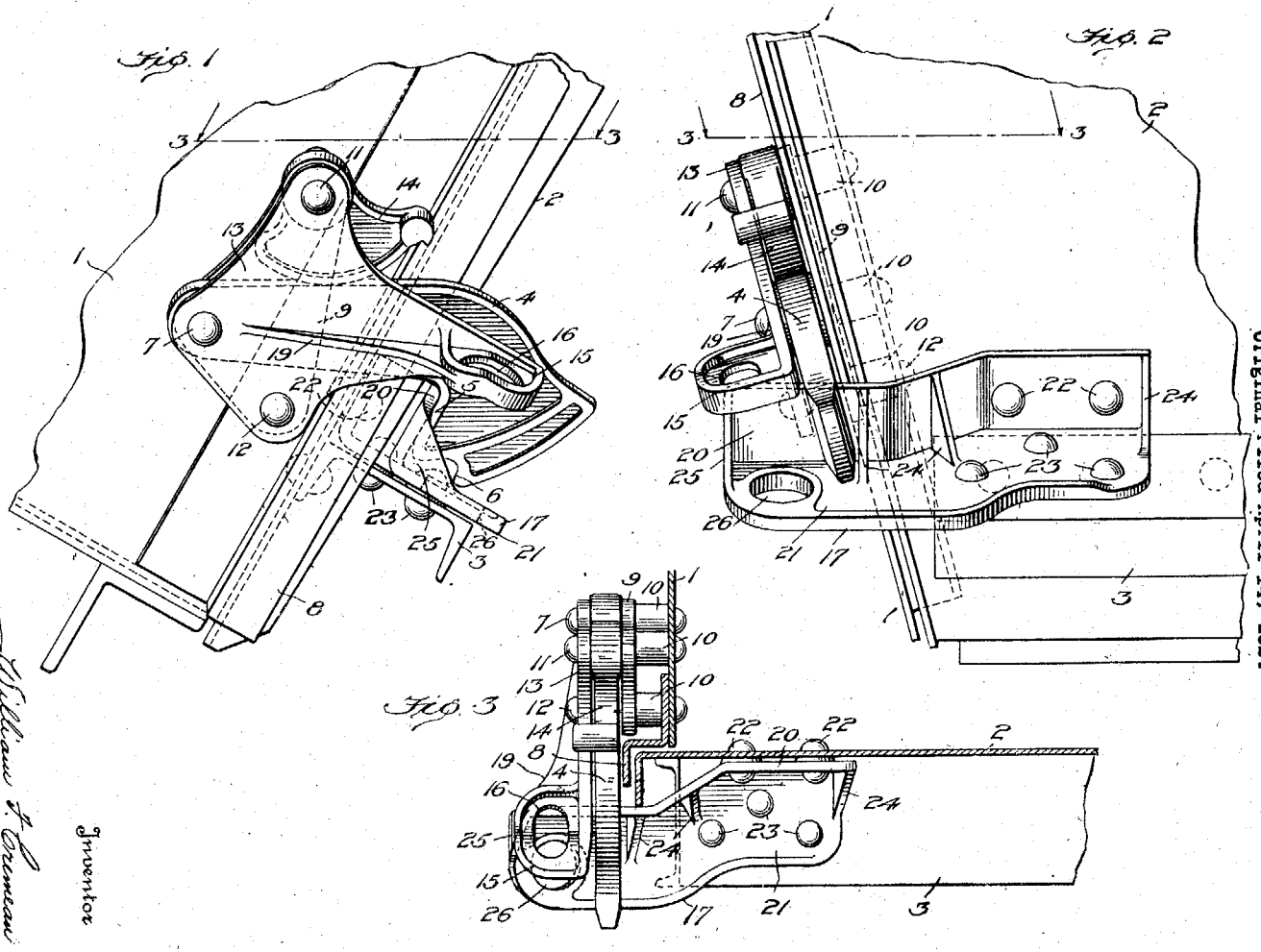
Inventor
William F. Cremean
By Ritter & Mechlin
Attorneys Nov. 16, 1926. W. F. CREMEAN Re. 16,472

CAR DOOR MECHANISM

2 Sheets-Sheet 2

Original Filed April 14, 1924

Inventor

William F. Cremean

By Potter & Mechlin his Attorneys

Reissued Nov. 16, 1926.

Re. 16,472

UNITED STATES PATENT OFFICE.

WILLIAM F. CREMEAN, OF TOLEDO, OHIO.

CAR-DOOR MECHANISM.

Original No. 1,528,913, dated March 10, 1925, Serial No. 706,363, filed April 14, 1924. Application for reissue filed October 8, 1926. Serial No. 140,384.

My invention relates to car door mechanism for retaining in closed position a hinged door which is adapted to swing to open position under the influence of gravity to permit the lading of the car to be discharged. The principal object of the invention is to provide, in conjunction with suitable door mechanism, strong, simple and efficient means for forcing the door to its position of final closure.

A principal feature of the invention consists in providing, in combination with a hinged door and pivoted means for supporting the latter in partly closed position and also in fully closed position, means rigidly connected to the car body affording a fulcrum for a removable lever adapted to cooperate with a door to force the latter from partly closed position to fully closed position, the fulcrum means being spaced from the car body and overlapping the outer face of the said pivoted means.

Another feature of the invention resides in the combination of a hinged door provided with an arm extending outwardly beyond the side of the car body, a pivotally mounted hook adapted to engage said arm to support the door in closed position, and a cover plate member secured to the car body and overlying the outer face of the hook, the cover plate having an opening adapted to receive a removable lever for forcing the door from partly closed to fully closed position, and the said opening being positioned so that the removable lever may be brought into engagement with the said arm carried by the door.

A more specific feature of the invention consists in the combination with a hinged door having an arm extending outwardly beyond the side of the car body, of a pivotally mounted hook provided with a plurality of ledges adapted to engage said arm to sustain the door against an opening movement, and a cover plate member secured to the car body and overlying the outer face of the hook, said cover plate being formed with a perforated lug projecting outwardly from the plane of operation of the hook and adapted to form a fulcrum for a removable lever cooperating with said arm to raise the door from a position in which it is supported on one of the ledges of the hook to a position in which it is supported on the other of said ledges, the said arm being provided with an opening adapted to receive the said lever.

Other features of the invention, residing in particular details of construction and combinations of parts, will hereinafter appear and be pointed out in the claims.

In the drawings illustrating a preferred embodiment of the invention,

Figure 1 is a fragmentary side elevational view of a portion of one of the hoppers of a railway car of a well known type, showing mechanism involving the invention applied thereto.

Figure 2 is a fragmentary end elevational view of the construction shown in Fig. 1.

Figure 3 is a sectional view in the plane of lines 3—3, Figs. 1 and 2, looking in the direction of the arrows.

Figure 5:
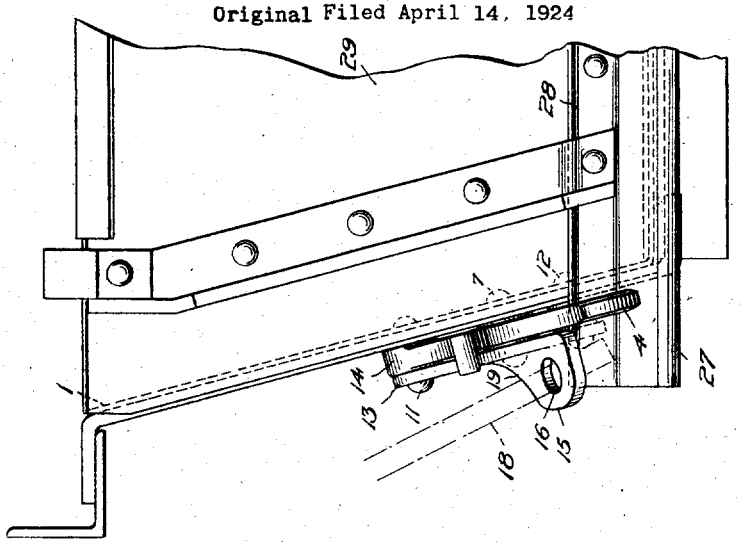
Figure 5 is a fragmentary view in end elevation illustrating the construction shown in Fig. 4.
Figure 4:
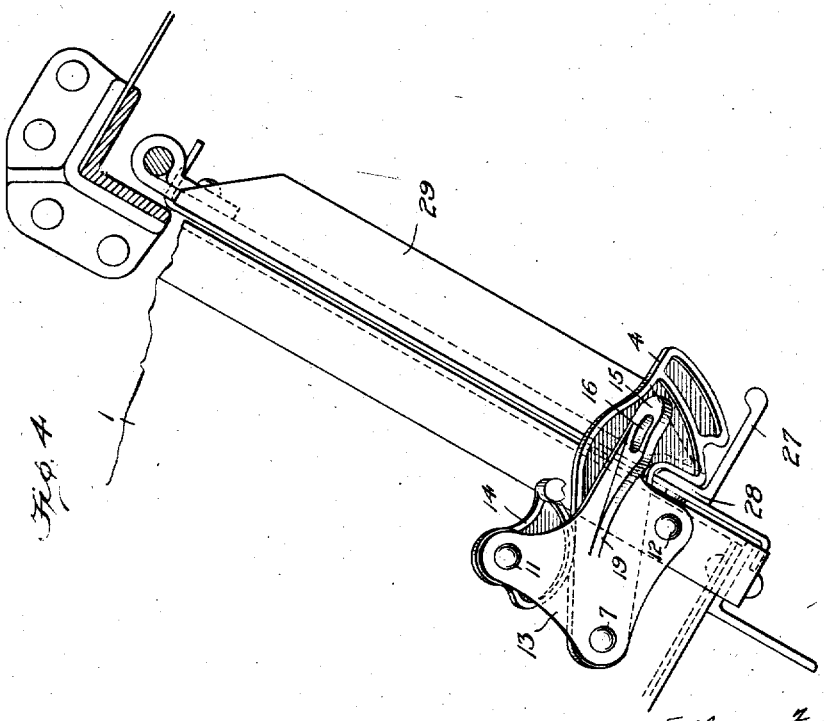
Figure 4 is a side elevational view corresponding to Fig. 1, but illustrating a modified form of the invention.

The cars illustrated in the drawings are of the well known type embodying hoppers having sloping side walls, but it is to be understood that the invention claimed is not limited to cars of the particular forms shown. In the construction illustrated in Figs. 1, 2 and 3, 1 indicates the side wall or sheet of a car hopper, and 2 is a hinged door for closing the hopper discharge opening in the usual manner. The door may be hinged to the car body, as shown in Figs. 4 and 5 so that it is adapted to swing to open position under the influence of gravity. Secured to the outer face of the door is a stiffening member or door spreader 3 which may advantageously be in the form of a channel iron whose flanges project downwardly. The door spreader extends transversely of the car and is rigidly connected to the sections of the door on opposite sides of the car center sills so as to cause said door sections to operate as a single unit. Although a portion of the door at one side only of the car is illustrated, it will be understood that the door construction on the opposite side of the car is identical; and while only one set of devices for effecting the closing and the support of the door is shown, it will of course be appreciated that similar mechanism is applied to the opposite side of the hopper so as to sustain the door at that point.

Pivotally mounted upon the side sheet 1 of the car body is a door locking member which preferably is in the form of a hook 4 having a plurality of ledges 5 and 6, respectively. The locking hook 4 is pivotally mounted upon a post or rivet 7 so as to swing by gravity to locked position. When the side sheet 1 of the hopper is provided along the edge of the hopper discharge opening with a flanged or offset portion, as indicated at 8, the pivoted hook may be spaced from the side sheet 1 sufficiently to clear said flange be interposing a bracket 9 between the hook and the side sheet. The spacing member 9 may be provided with hollow posts or thimbles 10 for the reception of the rivets 7, 11 and 12 passing through the side sheet of the hopper.

Overlapping the outer face of the hook 4 is a cover plate member 13 secured to the car body by means of the rivets 7, 11 and 12. The hook 4, which preferably is in a plane parallel to the inclined hopper sheet 1, operates in the space between the spacing plate 9 and the cover plate 13. Operating also between these members and pivotally mounted upon the rivet 11 is a locking cam or dog 14 of well known form which, when in the position shown in the several views, engages the back of the hook 4 so as to prevent the latter from accidentally moving to a position permitting the door to be released.

The cover plate 13, which is adapted to support the hook 4 against lateral thrusts, is provided with a portion 15 forming a fulcrum for a removable lever which the trainman may employ to enable him to force the door 2 from a partly closed position to a fully closed position. The fulcrum forming portion of the cover plate is preferably in the form of an outwardly projecting lug extending at an angle to the plane of operation of the hook 4 and having an opening 16 into which the removable lever may be inserted so as to extend downwardly and engage the arm 17 with which the car door is equipped for cooperating with the hook member 4. The position of this removable lever 18, when it is used for forcing the door to closed position, is as illustrated in dotted lines in Fig. 5. To stiffen the cover plate member 13 and to strengthen the fulcrum lug 15 thereof a tapered reinforcing rib or flange 19 may advantageously extend from the outermost portion of the lug toward the pivot 7 of the hook in the general line of strain imparted to the cover plate when the removable door prying lever is operated.

The door 2 is provided at each side of the car with a locking arm 17 extending outwardly beyond the adjacent side of the car body. In the construction shown in Figs. 1, 2 and 3 this door arm 17 is formed as a casting provided with angularly disposed flanges 20 and 21, the former being connected to the door 2 by means of rivets 22 and the latter being secured to the door stiffener or door spreader 3 by means of rivets 23. The casting forming the door arm 17 may be provided with suitable stiffening flanges or gussets 24 connecting the angularly disposed flanges 20 and 21 and preferably is provided with an end flange or gusset 25 adapted to stand in overlapping relation to the end of the hook 4 when the latter is in locked relation to the door arm 17. Near its outer end the flange 21 of the arm 17 is preferably formed with an opening or recess 26 for receiving the lower end of the removable door prying lever. When the flange 20 of the door arm is seated upon the ledge 5 of the pivoted hook the door is maintained in fully closed position, but when the said flange is supported upon the auxiliary ledge 6 of the hook 4 the door 2 is supported in a partially closed position as will be readily understood.

As is well known, it is often very difficult to effect a complete closure of the swinging doors of hopper cars. This is due to the fact that the doors become warped or distorted because of the service to which they are subjected, and moreover, small pieces of lading sometimes lodge in positions making the complete closing of the doors a matter of considerable difficulty. It is, however, an easy matter in all cases to swing the door to a partially closed position such as it would occupy when supported upon the auxiliary ledge 6 of the pivoted hook. Mechanism constructed in accordance with the invention provides means for effectively applying to the doors the increased power necessary to force them from the position of partial closure to the fully closed position. The trainman, after having swung the door to a position in which it is temporarily supported upon the ledge 6 of the hook, merely inserts a lever or pry bar through the opening 16 of the cover plate member 13, passing it downwardly until its lower end extends into or through the corresponding opening 26 of the door arm 17. By applying force to the upper end of the lever the door may then be readily moved to closed position permitting the ledge 5 of the hook to come into supporting engagement with the hook seat or flange 20 of the door arm. When the hook is thus in locking engagement with the door arm 17 the locking cam 14 is rotated so as to engage the hook, thereby preventing accidental release of the latter. It will be perceived the construction is such that the parts of the mechanism are very simple and rugged and that the trainman may stand in a position enabling him to effectively apply power to the removable door closing lever.

The modified construction shown in Figs. 4 and 5 differs substantially from that heretofore described only in that the bracket 9 by which the hook 4 is spaced from the side 1 of the hopper is omitted as no hopper flange 8 is provided, and in that the door arm for cooperating with the hook 4 to support the door against opening movement is formed as a part of the door stiffener or door spreader 27 instead of being fashioned as a separate member or casting 17. In this form of the invention the lower end of the removable lever 18 is adapted to engage the flange 28 of the door spreader which is secured to the door 29, the door spreader being shown as a bulb angle. The hook 4, cover plate 13, and locking dog or cam 14 in this form of construction are preferably identically the same as the corresponding parts heretofore described, and accordingly corresponding reference characters have been applied thereto.

I claim:—

1. In car door mechanism, the combination with a hinged door adapted to swing to open position under the influence of gravity, of means for supporting said door in partly closed position, means for supporting said door in closed position, said last named means including a member pivotally mounted on the car body, and means rigidly connected to the car body affording a fulcrum for a removable lever adapted to cooperate with said door to force the latter from partly closed position to fully closed position, said fulcrum means being spaced from the car body and overlapping the outer face of said pivotally mounted member.

2. In car door mechanism, the combination with a hinged door adapted to swing to open position under the influence of gravity, of a hook device pivotally mounted upon the car body and adapted to cooperate with said door to support the latter in closed position and in partly closed position, and a cover member for said hook device secured to the car body and overlapping the outer face of said hook device, said cover member being provided with a portion forming a fulcrum for a removable lever adapted to cooperate with said door to force the latter from partly closed position to fully closed position.

3. In car door mechanism, the combination with a hinged door adapted to swing to open position under the influence of gravity, of a hook pivotally mounted on the car body and adapted to cooperate with said door to support the latter in closed position, and a cover plate member secured to the car body and overlying the outer face of said hook, said cover plate being provided with a portion adapted to form a fulcrum for a lever whereby said door may be forced from partly closed position to fully closed position.

4. In car door mechanism, the combination with a hinged door adapted to swing to open position under the influence of gravity, of a hook pivotally mounted on the car body and adapted to cooperate with said door to support the latter in closed position, and a cover plate member secured to the car body and overlying the outer face of said hook, said cover plate member being provided with an outwardly projecting lug extending at an angle to the plane of operation of said hook, and said lug being adapted to form a fulcrum for a removable lever cooperating with said door to force the latter from partly closed position to fully closed position.

5. In car door mechanism, the combination with a hinged door adapted to swing to open position under the influence of gravity and provided with an arm extending outwardly beyond the adjacent side of the car body, of a hook pivotally mounted on the car body and adapted to engage said arm to support the door in closed position, and a cover plate member secured to the car body and overlying the outer face of said hook, said cover plate member being formed with an opening adapted to receive a removable lever for forcing the door from partly closed to fully closed position, said opening being so disposed that said lever may be caused to engage said arm.

6. In car door mechanism, the combination with a hinged door adapted to swing to open position under the influence of gravity and provided with an arm extending outwardly beyond the adjacent side of the car body, of a hook pivotally mounted on the car body and adapted to engage said arm to support the door in closed position, and a cover plate member secured to the car body and overlying the outer face of said hook, said cover plate member being formed with a perforated lug extending over said arm and adapted to form a fulcrum for a removable door-prying lever, and said arm being provided with an opening adapted to receive a door-prying lever extending through said perforated lug.

7. In car door mechanism, the combination with a hinged door adapted to swing to open position under the influence of gravity and provided with an arm extending outwardly beyond the adjacent side of the car body, of a hook pivotally mounted on the car body and provided with a plurality of ledges adapted to engage said arm to sustain said door against an opening movement, and a cover plate member secured to the car body and overlying the outer face of said hook, said cover plate member being provided with a lug projecting outwardly from the plane of operation of said hook adapted to form a fulcrum for a removable lever cooperating with said arm to raise said door from a position in which it is supported on one of the ledges of said hook to a position in which it is supported on the other of said ledges.

8. In car door mechanism the combination with a hinged door adapted to swing to open position under the influence of gravity and provided with an arm extending outwardly beyond the adjacent side of the car body, of a hook pivotally mounted on the car body and adapted to engage said arm to support the door in closed position, and a cover plate member secured to the car body and overlying the outer face of said hook, said cover plate member being provided with a portion adapted to form a fulcrum for a removable lever whereby said door may be forced from partly closed position to fully closed position, said fulcrum being arranged to permit the removable lever to engage said arm outwardly of said hook.

9. In car door mechanism, the combination with a hinged door, of means for cooperating with a removable lever adapted to force the door to closed position, said means involving a member carried by said door forming a seat for said lever, and a member carried by the car body forming a fulcrum for said lever, said fulcrum member being disposed above said seat member so as to permit said removable lever when in operative position to extend upwardly in an outwardly inclined direction, and means movable with respect to said fulcrum for supporting said door in closed position.

10. In car door mechanism, the combination with a hinged door, of means for cooperating with a removable lever adapted to force the door to closed position, said means involving a member carried by the car body forming a fulcrum for said lever, and a member carried by said door forming a seat for said lever, said seat being below said fulcrum, and said lever when in engagement with said fulcrum and seat being adapted to have a plane of operation less inclined to the vertical than to the horizontal, and means for supporting said door in closed position.

11. A fulcrum member for car door mechanism of the type involving a hook device pivotally mounted on the car body and adapted to cooperate with a hinged door to support the latter against opening movement, said member being adapted to be secured to the car body in overlapping relation to the outer face of the hook device.

12. A cover plate member for car door mechanism of the type involving a hook device pivotally mounted on the car body and adapted to cooperate with a hinged door to support the latter against opening movement, said member having a plate portion adapted to be secured to the side of the car body and being provided with a lug disposed in a plane extending at an angle to the plane of said plate, said lug constituting a fulcrum for a removable door-prying lever.

13. A cover plate member for car door mechanism of the type involving a hook device pivotally mounted on the car body and adapted to cooperate with a hinged door to support the latter against an opening movement, said member being adapted to be secured to the car body in overlapping relation to the outer face of the hook device and being provided with a portion forming a fulcrum for a removable door-prying lever.

14. A cover plate member for car door mechanism of the type involving a hook device pivotally mounted on the car body and adapted to cooperate with a hinged door to support the latter against an opening movement, said cover plate being adapted to be secured to the car body in overlapping relation to the outer face of the hook device and being provided with an aperture for receiving a removable door-prying lever.

15. A cover plate member for car door mechanism of the type involving a hook device pivotally mounted on the car body and adapted to cooperate with a hinged door to support the latter against an opening movement, said member having a plate portion adapted to be secured to the car body in overlapping relation to the outer face of the hook device and being provided with a lug projecting outwardly at an angle to the plane of the said plate portion, said lug being perforated to receive a removable door-prying lever.

WILLIAM F. CREMEAN.